(12) United States Patent
Coenraets

(10) Patent No.: US 12,104,399 B2
(45) Date of Patent: Oct. 1, 2024

(54) DEVICE FOR COVERING A SURFACE COMPRISING DISCREET LOCKING MEANS

(71) Applicant: BECOFLEX, Strepy-Bracquegnies (BE)

(72) Inventor: Benoît Coenraets, Strepy-Bracquegnies (BE)

(73) Assignee: Becoflex, Strepy-Bracquegnies (BE)

( * ) Notice: Subject to any disclaimer, the term of this patent is extended or adjusted under 35 U.S.C. 154(b) by 289 days.

(21) Appl. No.: 17/777,736

(22) PCT Filed: Nov. 23, 2020

(86) PCT No.: PCT/EP2020/083046
§ 371 (c)(1),
(2) Date: May 18, 2022

(87) PCT Pub. No.: WO2021/105053
PCT Pub. Date: Jun. 3, 2021

(65) Prior Publication Data
US 2022/0403674 A1    Dec. 22, 2022

(30) Foreign Application Priority Data
Nov. 28, 2019   (BE) .................................. 2019/5844

(51) Int. Cl.
*E04H 4/10*     (2006.01)
*A01G 9/22*     (2006.01)
(Continued)

(52) U.S. Cl.
CPC .............. *E04H 4/101* (2013.01); *A01G 9/227* (2013.01); *A63C 19/12* (2013.01); *B60J 7/085* (2013.01)

(58) Field of Classification Search
CPC .......... E04H 4/101; A01G 9/227; A63C 19/12; E06B 9/581
See application file for complete search history.

(56) References Cited

U.S. PATENT DOCUMENTS 4,001,900 A * 1/1977 Lamb ..................... E04H 4/10
4/498
4,466,143 A * 8/1984 Lamb ..................... E04H 4/101
4/502
(Continued)

FOREIGN PATENT DOCUMENTS

BE   1018230 A3   7/2010
EP   0106606 A2   4/1984
(Continued)

OTHER PUBLICATIONS

Int'l Search Report for PCT/EP2020/083046, dated Feb. 22, 2021.

*Primary Examiner* — Beth A Stephan
(74) *Attorney, Agent, or Firm* — MaxGoLaw PLLC

(57) ABSTRACT

A device for covering a surface includes (a) a covering, each longitudinal edge of which is provided with a projecting element; (b) a rotatably mounted drum suitable for rolling up or unrolling the covering, and movable in translation on rails placed on either side of the surface; (c) a system for continuously locking/unlocking the projecting element in the rails during the translation of the drum. The projecting element includes a multitude of discreet elements distributed along each longitudinal edge separated from one another by an average distance (d).

12 Claims, 6 Drawing Sheets

Figure 1A:
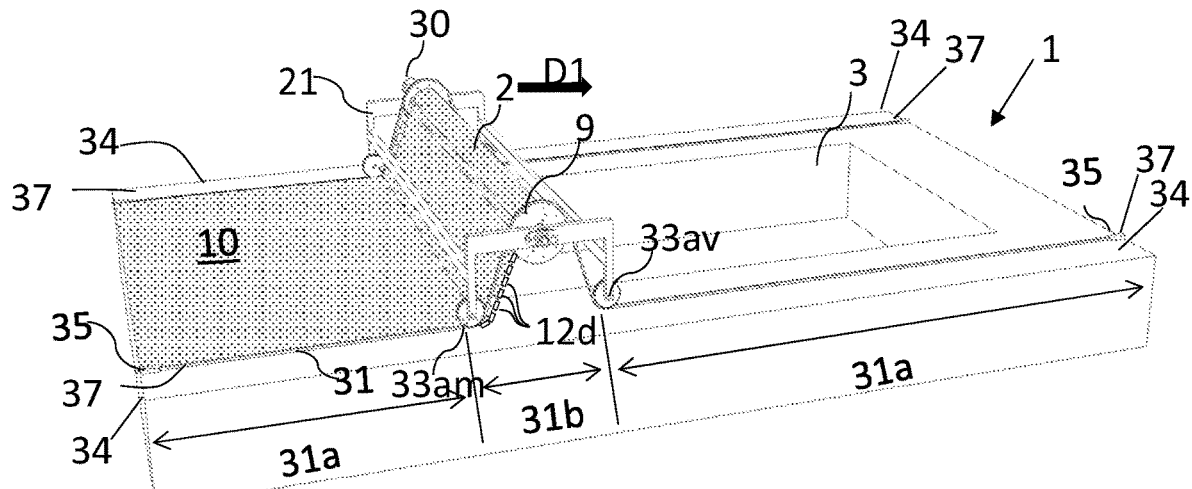

(51) Int. Cl.
  *A63C 19/12*  (2006.01)
  *B60J 7/08*  (2006.01)

(56) References Cited

U.S. PATENT DOCUMENTS

| | | | | |
|---|---|---|---|---|
| 8,418,279 | B2* | 4/2013 | Coenraets | E04F 10/0648 |
| | | | | 4/502 |
| 8,708,025 | B2* | 4/2014 | Coenraets | B60J 7/085 |
| | | | | 4/502 |
| 9,366,045 | B2* | 6/2016 | Coenraets | B61D 39/00 |
| 9,546,492 | B2* | 1/2017 | Coenraets | E04H 4/101 |
| 10,550,592 | B2* | 2/2020 | Coenraets | A63C 19/12 |
| 10,961,773 | B2* | 3/2021 | Coenraets | A63C 19/12 |
| 11,965,354 | B2* | 4/2024 | Coenraets | A63C 19/12 |
| 11,988,014 | B2* | 5/2024 | Coenraets | E04H 4/101 |
| 2019/0010757 | A1* | 1/2019 | Coenraets | B60J 7/085 |
| 2019/0063093 | A1* | 2/2019 | Coenraets | A63C 19/12 |
| 2020/0340262 | A1* | 10/2020 | Blary | A63C 19/12 |
| 2022/0049513 | A1* | 2/2022 | Coenraets | E04H 4/101 |

FOREIGN PATENT DOCUMENTS

| | | | |
|---|---|---|---|
| WO | 2003106801 | A1 | 12/2003 |
| WO | 2017130053 | A1 | 8/2017 |

* cited by examiner

DEVICE FOR COVERING A SURFACE COMPRISING DISCREET LOCKING MEANS

DOMAIN OF THE INVENTION

The invention relates to a device for covering a surface that is easy to install and is optimized for the requirements of the related application. In particular, the present invention relates to a covering device in which the cover has a specific projecting fastening element enabling the reversible anchoring of the longitudinal edge of the cover during movement thereof, including discrete elements. This significantly facilitates repair of the projecting element in the event of damage, compared to a continuous bead.

TECHNOLOGICAL BACKGROUND

Covers are used on surfaces for reasons related to the nature of the surfaces. Thus, in the case of a pool such as a swimming pool, the cover can prevent contamination by leaves or animals, can save energy, water and reagents, and can or must ensure personal safety, in particular for children. In a desalination pool or other fluid-treatment pool, a cover helps to prevent liquid dilution caused by rain or excessive evaporation caused by heat.

In the case of a sports surface such as an outdoor grass or clay tennis court, a cover helps to provide protection against the weather, in particular intermittent rain. Furthermore, vehicle bodies are covered notably to ensure cargo stability in the presence of pressure drops caused by the movement of the vehicle, and to protect the cargo against the weather. Covers are also used as blinds for greenhouses, conservatories or vehicle windows to prevent overheating inside, and as sun protection for patio awnings.

In all of these examples, an inexpensive covering device that enables covering and uncovering that is easy, safe, reproducible and fast, and that requires a minimum of human intervention, and that in particular has a long a service life as possible, is usually sought. Numerous devices for covering a surface have been developed, from basic models to more sophisticated models. For example a first somewhat basic device for a swimming pool includes a cover, inflatable or otherwise, that is unrolled, stretched out and fastened manually to the edges of the swimming pool. This type of device is described for example in documents U.S. Pat. No. 6,691,334, GB2379163 and FR2652373. It is clear that, in consideration of maintenance and storage, this case only applies to quite small swimming pools.

Many devices use a rotary drum to roll up and store the cover while the surface is uncovered. Covering devices for a surface that use a rotary drum can be split into two categories:

(a) Devices including a static drum at one of the transverse ends of the surface to be protected. The cover is deployed by traction by unrolling the drum, and is dragged along the surface during deployment and withdrawal. This generates significant friction, which increases the force required to deploy and withdraw the cover, and accelerates the wearing of the cover. Automatic covering devices are disclosed notably in the following documents: U.S. Pat. No. 3,574,979, GB2199741, US2005/0097834, CA2115113, US2001/0023506, U.S. Pat. No. 5,930,848, and US400190.

(b) Devices in which the motorized drum is mounted on a longitudinal translation mechanism. This mechanism moves the drum above the surface to be covered, which enables the cover to be literally "laid" on the surface when deployed by simultaneously unrolling the drum during the longitudinal movement thereof, then to be lifted during withdrawal by simultaneously rolling on to the drum. The cover therefore does not slide on the surface during deployment or withdrawal. Examples of automatic devices of this type are for example disclosed in the following documents: WO2005/026473, FR2900951, DE2257231, FR2893651, FR2789425, FR2743502, and EP1719858.

The present invention relates to devices (b) in which the motorized drum is mounted on a longitudinal translation mechanism on account of the related advantages over devices (a) that have a static drum at one transverse end.

In the present application, the terms "longitudinal" and "transverse" and related terms refer respectively to the direction of movement of the drum and the direction of the axis of rotation of said drum.

In many applications, it is advantageous to lock the longitudinal edges of the cover as the cover is deployed. This is particularly advantageous in swimming pools, since it prevents people who step on the cover from falling into the water through a space between the longitudinal edge of the cover and the edge of the swimming pool. Furthermore, sealing the peripheral contact zone between the cover and the longitudinal edges of the surface can prevent dirt, dead leaves and twigs, as well as small animals such as mice or snakes, from entering the swimming pool. This also provides the option of pressurizing the air between the surface of the water and the lower surface of the cover, in order to inflate the cover. More sophisticated devices have been proposed to enable the longitudinal edges of the cover to be reversibly fastened during deployment, such as in document FR2803769, which provides a system for fastening the longitudinal edges of the cover comprising sections of grilles that are lifted and dropped section by section on said longitudinal edges of the cover while keeping said edges inside a gutter during deployment of the cover. In this design, the longitudinal edges of the cover are clamped without being locked, which provides less safety in particular in the case of swimming pools.

An advantageous system enabling the longitudinal edges of the cover to be fastened during deployment while simultaneously exerting a transverse tractive force on said cover to perfectly tension the cover is disclosed in WO2010/010152, WO2010054960 and WO2014064138. In these devices, the longitudinal edges of the cover are provided with a continuous bead or band that is inserted into the upward facing opening of a U-shaped rail, with one or more flanges partially closing said opening. The bead slides beneath a flange and is held in this position by appropriate fastening means, thereby solidly fastening the longitudinal edges of the cover.

The locking systems described in WO2010010152, WO2010054960 and WO2014064138 include:

(a) two rails extending along the longitudinal sides and on both sides of the surface to be covered. The rails are made of a section with an outward facing opening (i.e. oriented away from the surface to be covered) in one of the faces thereof, and one or more flanges partially closing said opening from both sides (if there is only one flange, said flange is positioned on the side adjacent to the surface to be covered), (b) each of the longitudinal edges of the cover has at least one continuous bead, which is preferably substantially cylindrical, provided along the entire length thereof with a strip fastened to at least one face of the cover, (c) engagement means for engaging said continuous bead in the opening formed by the flange or flanges of the rail and for sliding said bead beneath one of the flanges of the fastening means to prevent the continuous bead from coming out of said opening, such that the cover is locked to the rail.

Such a locking system enables the continuous bead to slide in the opening of the rail and to be wedged therein, thereby continuously fastening the corresponding longitudinal edge of the cover in said rail and holding the cover above the surface to be covered even in the event of very high mechanical stresses, caused for example by a pressure difference (i.e. higher or lower pressure) between the two surfaces of the cover, or the weight of the cover. In the case of swimming pools, this provides safety in the event of access (authorized or otherwise) to the cover. The strength of the locking system can easily reach a range of 5 to 10 kN/m (500 to 1000 kg/m), which is sufficient for numerous applications. Higher locking strengths can be achieved using different materials.

The continuous beads of such a cover are however subjected to very high mechanical stresses, from friction, UV exposure and (in the case of swimming pools) exposure to chlorine vapors. These stresses considerably reduce the service life of the continuous beads. Since the beads are sewn, glued and/or welded to the cover in a generally irreversible manner, it is not easy, and may be impossible, to replace the beads, and therefore the entire cover must be replaced, which has a significant cost and environmental impact.

It would be beneficial to have a locking system as efficient as the system using continuous beads described above that could be repaired in the case of wear or breakage. The present invention proposes a cover including a projecting element along the longitudinal edges thereof that is different from a continuous bead and that simultaneously enables firstly the longitudinal sides of the cover to be firmly locked in the rails during deployment of the cover and unlocked during withdrawal, and secondly the repair or replacement thereof in the event of breakage or wear.

SUMMARY OF THE INVENTION

The invention is as defined in the main claim and preferred variants are defined in the dependent claims. The present invention notably relates to a device for covering a surface comprising the following elements:
(a) A substantially rectangular cover with two longitudinal edges opposite one another and two transverse edges opposite one another. Each longitudinal edge is provided with a projecting element extending along said edge.
(b) A drum of radius that is mounted in rotation, and that is able to roll up or unroll the cover. The drum is mounted on a longitudinal translation mechanism along rails positioned on both sides of said surface. Each rail is a section having an opening in one face oriented away from the surface to be covered, and provided with a locking element (6a, 6c). The translation mechanism enables the longitudinal translational movement of the drum in a first direction to unroll the cover and deploy the cover above the surface (3) to be covered, and in a second direction to roll up the cover and remove the cover from said surface.
(c) A deflection pulley is provided on each side of the surface to be covered to guide and position said projecting element of each longitudinal edge of the cover opposite the opening of the corresponding rail during translational movement of the drum in the first direction to unroll the cover,
(d) a continuous locking system for locking the projecting element of the longitudinal edges of the cover in the opening of said rails, enabling the projecting element to be locked with the locking element of the corresponding rail once the projecting element has been engaged in the opening and as the cover is unrolled, and to release the projecting element by disengaging the projecting element from the locking element during translational movement of the drum in the second direction as the cover is rolled up, According to the present invention, the projecting element of each longitudinal edge of the cover includes a multitude of discrete elements distributed along each longitudinal edge. The discrete elements have an average length (L) and are arranged side by side along the corresponding longitudinal edge, separated from one another by an average distance (d) that is equal to or greater than 0 and is preferably less than L, forming projecting units of average length ($L_u = L + d$), in which the average length (L) and average distance (d) are measured parallel to the rails (6) when the cover is deployed. The average length ($L_u$) of the projecting units does not exceed $2\pi R/N$, in which $N \geq 10$ is a real number. Finally, each discrete element has a mechanical flexural rigidity at least two times greater than the mechanical flexural rigidity of the cover.

In a preferred embodiment of the invention, the locking element has a flange partially closing the side of the opening of each rail adjacent to the surface to be covered. Each discrete element forms a hook with an L-shaped or J-shaped profile, having:
  a portion continuously aligned with the surface of the cover and fastened to the corresponding longitudinal edge of the cover, and
  a transverse portion forming the hook, extending transversely in relation to the aligned portion, the hook being designed to hook the flange.

In another preferred embodiment of the invention, the locking element includes one or more magnets positioned in the opening of each rail. Each discrete element has at least one ferromagnetic portion designed to face and be attracted to one or more magnets when the discrete element is inserted in the opening of said rails. Alternatively, the discrete elements may include a magnetic portion, and the rails may include a ferromagnetic portion attracted by the magnetic portion of the discrete elements.

In another preferred embodiment of the invention, the locking element has a flange partially closing the side of the opening of each rail opposite the surface to be covered. Each discrete element has a protrusion that extends away from the cover and is aligned with the cover. The protrusion is designed to slide beneath the flange when a discrete element is inserted in the opening of said rails.

In another preferred variant of the invention, the locking element and the discrete elements form a snap-fit assembly system comprising a protrusion snap-fitted into a recess when a discrete element is inserted into the opening of said rails.

The locking system preferably includes two flexible belts each of which can,
  during translational movement of the drum in the first direction and as the cover is unrolled, be laid in the opening of the corresponding rail once the discrete elements have been engaged and wedged in the opening of the rail, and during translational movement of the drum in the second direction, be removed from said opening, thereby releasing the discrete elements and enabling said discrete elements to be disengaged from the corresponding rail as the cover is rolled up.

In a variant of the invention, the translation mechanism preferably includes a trolley that is mounted on the rails, that transversely overhangs the surface to be covered, that carries the drum, and that includes the following at each of the ends thereof:

- a drive wheel with a rotary shaft parallel to the rotary shaft of said drum,
- at least one downstream caster and one upstream caster resting on the rails or on a surface adjacent to the rails, enabling the longitudinal translational movement of the trolley, in which the former is mounted downstream and the latter is mounted upstream of the drive wheel in the first direction of movement, thereby forming a triangle of which the drive wheel is the upper apex.

In this variant, the downstream caster and the upstream caster preferably rest on the corresponding rail. The translation mechanism includes two flexible belts fastened only at each of the ends thereof to the four corners of the surface to be covered, and extend along the longitudinal edges of the surface to be covered in the following manner:

- the flexible belts are positioned in the opening of the rails in the lateral sections between a fastening point and the caster closest to said fastening point, thereby locking the discrete elements inserted into the opening in the lateral section containing the downstream caster,
- the flexible belts grip the drive wheel in the central section (31b) between the two casters (33av, 33am).

Alternatively, the translation mechanism comprises:

- two flexible belts including an inner face and an outer face separated from the inner face by a thickness of the belt, both the inner and outer faces of each flexible belt being notched, the inner surface of each flexible belt gripping the upstream and downstream casters as well as the drive wheel, and
- two gear racks arranged along the longitudinal edges and parallel to, and preferably inside, the opening of each rail, and the outer surface of a portion of each of the flexible belts between the corresponding downstream caster and the upstream caster meshes with the corresponding gear rack.

The device according to the present invention preferably includes an engagement shoe of the projecting element that is inserted slidingly into each rail, upstream of the deflection pulleys in the first direction of translational movement. The engagement shoe is designed to bring the projecting element into contact with the locking element of the corresponding rail, thereby locking the projecting element in the opening of the rail.

The covering device according to the present invention is particularly suited to covering one of the following surfaces:

- a pool filled or otherwise with a liquid, such as a swimming pool, or a water retention, treatment or desalination pool,
- a sports field, such as a tennis court or cricket pitch,
- a vehicle body,
- a glazed surface such as a greenhouse, a conservatory or a window of a vehicle.

A surface can be covered by a cover using a covering device as described above using the following steps:

(a) the drum is at an upstream end of the surface to be covered, with one transverse edge of the cover being fastened to this upstream transverse end of the surface and the remainder of the cover being rolled about the drum, (b) moving the drum in a first direction above the surface to be covered along the rails, thereby unrolling the cover from the drum and deploying the cover on the surface portion upstream of the drum, while simultaneously guiding and holding the projecting element of each longitudinal edge of the cover opposite the opening of the corresponding rail as the drum moves forward, (c) bringing the projecting element into contact with the locking element in the opening of the rail and locking the projecting element to the rail.

SHORT DESCRIPTION OF THE FIGURES

Figure 1B:
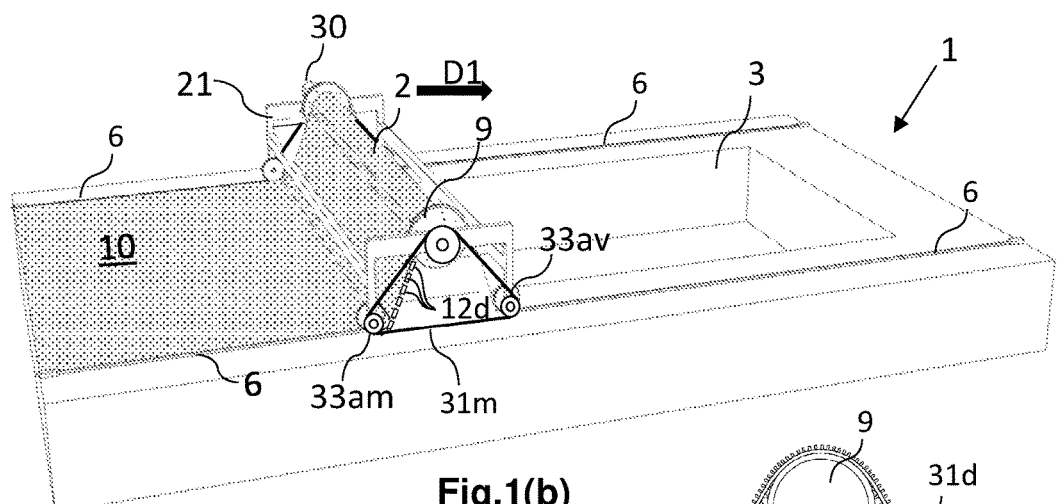
Figure 1C:
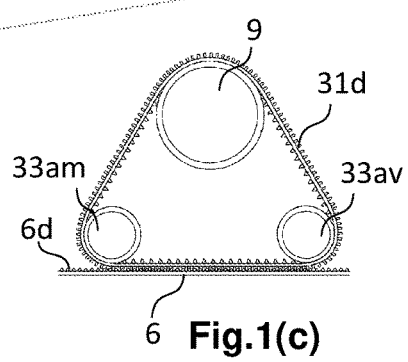

These and other aspects of the invention are described more clearly in the detailed description of specific embodiments of the invention, with reference to the figures, in which:

FIG. 1 Perspective overview of a surface with a drum in a position in which only an upstream portion of the surface is covered by a cover, (a) a first variant, (b) a second variant, (c) detail of the movement means of the variant in FIG. 1(b).

FIG. 2 Views of a projecting element including discrete elements according to the invention, (a) in deployed position and (b) partially rolled about a drum.

FIG. 3 Different variants (a) to (g) of discrete elements according to the invention.

Figure 4A:
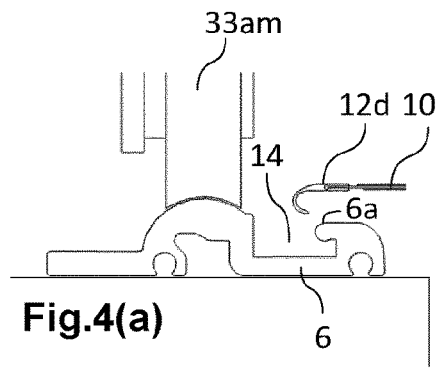
Figure 4B:
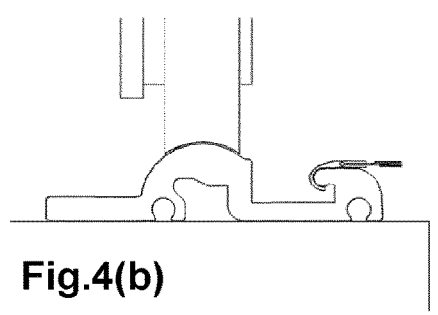
Figure 4C:
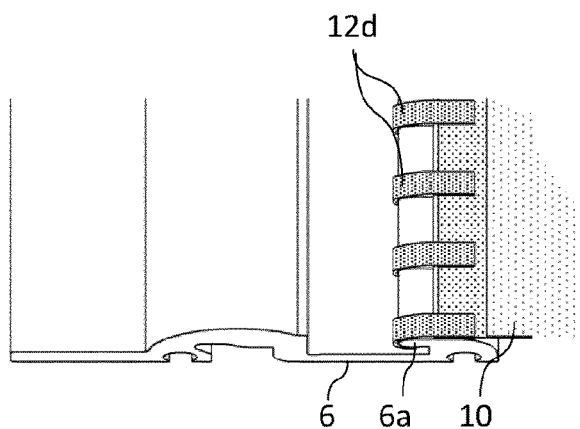

FIG. 4 Locking mechanism for locking a discrete element in the opening of a rail according to a first variant of the invention, (a) insertion of the discrete element into the opening of the rail, (b) in locked position, and (c) perspective view of the locking device.

FIG. 5 Locking mechanism for locking a discrete element in the opening of a rail according to a second variant of the invention, (a) insertion of the discrete element into the opening of the rail, (b) in locked position, and (c) perspective view of the locking device.

FIG. 6 Locking mechanism for locking a discrete element in the opening of a rail according to a third variant of the invention, (a) insertion of the discrete element into the opening of the rail, (b) in locked position, and (c) perspective view of the locking device.

FIG. 7 Locking mechanism for locking a discrete element in the opening of a rail according to a fourth variant of the invention, (a) insertion of the discrete element into the opening of the rail, (b) in locked position, and (c) perspective view of the locking device.

FIG. 8 Locking mechanism for locking a discrete element in the opening of a rail according to a fifth variant of the invention, (a) insertion of the discrete element into the opening of the rail, (b) in locked position, and (c) perspective view of the locking device.

FIG. 9 Deflection gear of the cover, (a) first variant, and (b) second variant.

FIG. 10 Translation mechanism including a belt, firstly according to (a) the variant in FIG. 1(a) and secondly according to (b) the variant in FIGS. 1(b) and (c).

DETAILED DESCRIPTION OF THE SPECIFIC EMBODIMENTS

As shown in FIG. 1, the automatic device (1) for covering a surface (3) according to the invention includes a cover (10) designed to protect said surface (3). The device (1) notably enables surfaces defined by the contour of a pool of water, such as a swimming pool, a water treatment pool, a used water treatment pool, a retention pool, a desalination plant, etc., to be covered. However, the invention could be used in any other domain requiring a surface to be covered, for example a clay or grass tennis court, a vehicle body, a glazed surface of a greenhouse, a window of a vehicle such as a train or bus, or a conservatory, etc. The term "surface" is therefore generally used in the present application to refer to any zone delimited by a perimeter.

The device (1) comprises a substantially rectangular cover with two longitudinal edges opposite one another and two transverse edges opposite one another, each longitudinal edge being provided with a projecting element (12, 12d) extending along said edge.

A first transverse edge of the cover is fastened to a drum (2) of radius R that is at least as long as the width of the transverse edge of the cover (10), in which the longitudinal and transverse edges of the cover must be respectively wide and long enough to cover the entire surface (3) to be protected when deployed. The drum (2) is mounted in rotation about a shaft parallel to the transverse edges of the cover. The drum is then mounted on a longitudinal translation mechanism along the rails (6) arranged on both sides of said surface (3), each rail comprising a section with an opening (14) on one face oriented away from the surface to be covered and provided with a locking element (6a, 6c).

The device (1) includes a fastening system positioned at an upstream transverse end of the surface to be covered, enabling the second transverse edge of the cover to be fastened to the upstream transverse end of the surface (3) to be covered. Any known type of fastening system satisfying the stress, safety and water-tightness requirements, as applicable in consideration of the intended use, may be used. For example, the fastening system may include a plurality of straps rigidly connected to the second transverse edge of the cover (10), said straps for example being provided with anchoring hooks that are fastened to the upstream transverse end of the contour delimiting the surface (3) to be covered. Alternatively, the second transverse edge of the cover may be provided with eyelets that are fastened to the upstream transverse end of the surface by a series of hooks, screws, a cable or any other means. Another variant is to wedge the transverse edge of the cover beneath a plate that is as long as the width of the cover and is fastened to the surface by screws traversing the cover. These anchoring means, and others that are too numerous to mention, hold the upstream transverse end of the cover (10) fast.

The translation mechanism enables the longitudinal translational movement of the drum (2) in a first direction to unroll the cover by rotation of the drum in a first direction about the shaft thereof and to deploy the cover above the surface (3) to be covered, and in a second direction to roll up the cover by rotation of the drum in a second direction and to remove the cover from said surface (3).

The first direction of translational movement enables the drum to move away from the upstream transverse end of the surface and to unroll the cover (10), deploy the cover, and cover the surface (3) to be protected. The drum can be rotated in the first direction by moving the drum, which exerts a tractive force on the cover, the second transverse edge of which is fastened to the upstream transverse end. The drum has resilient means such as a helical spring that is stretched by rotation of the drum in the first direction of rotation.

The second direction of translational movement enables the drum to approach the upstream transverse end of the surface and to roll up the cover (10), withdraw the cover, and uncover the surface (3). The rotation of the drum in the second direction is made possible by the resilient means such as a helical spring that is compressed and rotates the drum in the second direction of rotation.

Figure 9A:
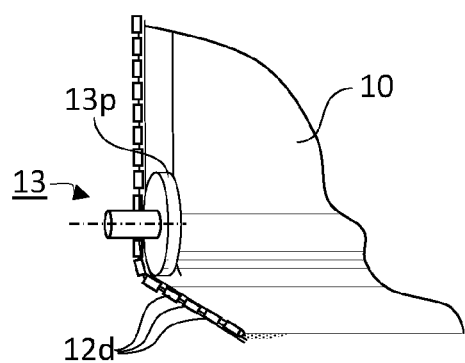
Figure 9B:
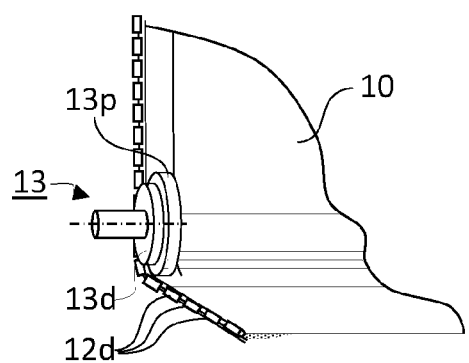

A deflection pulley (13) shown in FIGS. 9(a) and 9(b) provided on each side of the surface to be covered guides and positions the projecting elements (12, 12d) of the longitudinal edges of the cover opposite the opening (14) of the corresponding rail (6) during translational movement of the drum in the first direction to unroll the cover, The cover can be made of any material suitable for the intended application: synthetic or natural textile materials, polymer films, polymer, metal or wooden slats, etc. The cover may be transparent, opaque or translucent and may form a fluid barrier or conversely be porous, or may even be meshed as in a net. For example, when used in swimming pools, water treatment pools and the like, it is advantageous for the cover to have drainage holes to prevent rainwater from accumulating on the cover, thereby preventing the formation of puddles of water on the surface of the cover.

The device includes a continuous locking system for locking the projecting elements (12, 12d) of the longitudinal edges of the cover (10) in the opening (14) of said rails (6). Once the projecting element has been engaged in the opening (14), this locking system enables the projecting element to be locked with the locking element (6a, 6c) of the corresponding rail as the cover (10) is unrolled. During translational movement of the drum in the second direction, the locking system is designed to release the projecting element by enabling the projecting element to disengage from the locking element (6a, 6c) as the cover is rolled up about the drum.

Figure 2A:
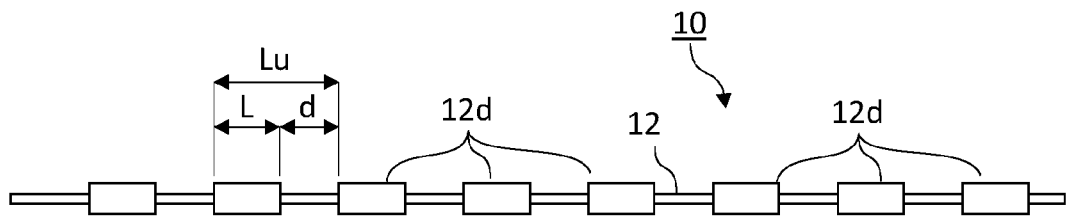
Figure 2B:
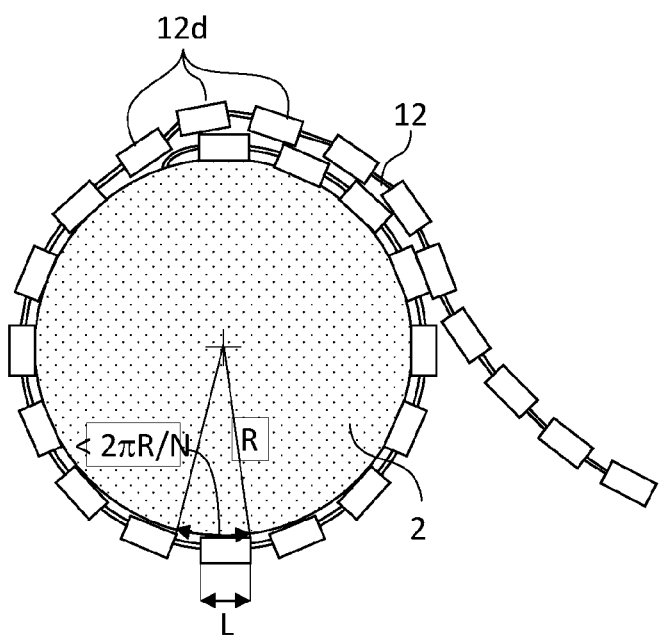

As shown in FIGS. 2(a) and 2(b), the projecting element (12) positioned along the two longitudinal edges of the cover is formed by a multitude of discrete elements (12d) distributed along each longitudinal edge. The discrete elements (12d) have an average length (L) and are arranged side by side along the corresponding longitudinal edge, separated from one another by an average distance (d) that is equal to or greater than 0 and is preferably less than L. A distance d<L prevents the discrete elements (12d) of the cover rolled up about the drum from being interposed between two discrete elements of an adjacent layer rolled up about the drum. This problem may arise in particular if the discrete elements are mounted such as to be able to pivot about the longitudinal edge of the cover or if said discrete elements have hooks that could catch on an adjacent rolled-up layer. A discrete element and a space separating said discrete element from an adjacent discrete element together form a projecting unit of average length Lu=L+d, where the average length L and the average distance d are measured parallel to the rails (6) when the cover is deployed. The mechanical flexural rigidity of the discrete elements is greater than the mechanical flexural rigidity of the cover, in particular at least two times greater than the mechanical flexural rigidity of the cover, and preferably at least ten times greater than the mechanical flexural rigidity of the cover. To optimize rolling about the drum, the average length Lu of the projecting units does not exceed $2\pi R/N$, in which N>10 is a real number. A length Lu=$2\pi R/N$ corresponds to N projecting units surrounding the drum of radius R in the first winding of the cover about the drum. The example shown in FIG. 2(b) has a length of Lu=$2\pi R/N$, where N~=16, since 16 projecting units surround and are in contact with the drum of radius R.

In a specific case, the distance between two discrete elements (12*d*) can be zero (d=0) and the discrete elements can be in contact and able to pivot in relation to one another in the manner of a bicycle chain. This solution may be beneficial in specific applications, but increases the weight of the cover and the rigidity of the longitudinal edges, which is not necessarily desirable. In most cases, it is therefore preferable for d>0.

One advantage of using discrete elements (12*d*) rather than a continuous bead to lock the longitudinal edges of the cover in the corresponding rails is that, in the event of breakage or wear of a portion of the projecting element, said portion can be easily replaced and the cover can continue to be used, while it is not easy to repair a continuous bead with a damaged portion.

Several variants of discrete elements (12*d*) (see FIGS. 3(*a*) to 3(*g*)) and locking elements (6*a*, 6*c*) can be used in the present invention. The discrete elements have an aligned portion fastened to the corresponding longitudinal edge of the cover and a locking portion designed to interact with the locking element (6*a*, 6*c*) of the rails. The aligned portion of the discrete elements (12*d*) can be fastened by gluing, welding, sewing, screwing, riveting, snap-fitting, etc. Reversible fastening means, such as screwing or snap-fitting, are preferred to facilitate replacement of a damaged discrete element (12*d*). However, non-reversible fastening means, such as gluing, welding and riveting, can enable replacement of a discrete element by cutting out a portion of the longitudinal edge surrounding the discrete element and replacing the removed portion with a new cover portion or by a ring supported by the discrete elements adjacent to the removed discrete element. The discrete elements can be fastened to the longitudinal edges of the cover rigidly or alternatively pivotingly. For example, the longitudinal edges may include a bead about which each discrete element may engage pivotingly, as shown for example in FIGS. 3(*a*), 3(*b*), 3(*d*) to 3(*g*), 4(*c*), 5(*c*), and 7(*c*).

The discrete elements of the projecting element of the longitudinal edges are guided towards the opening (14) of the corresponding rails using known means. For example and as shown in FIGS. 4(*a*) to 8(*a*), the discrete elements can be guided above the opening by exerting a tractive force on the cover in the transverse direction. Such a transverse tractive force is made possible for example using means for applying transverse tension to the cover. As shown in FIGS. 10(*a*) and 10(*b*), such means preferably include two tensioning bearings (15) separated from one another by a distance greater than the thickness of the cover and less than the thickness of the projecting element (12, 12*d*) in order to apply transverse tension to the cover.

The discrete elements can be guided into the openings by the substantially cylindrical deflection pulley (13) mounted in rotation about a shaft parallel to the transverse direction of the cover on each side of the drum. FIG. 9(*a*) shows an example deflection pulley (13) formed by a pulley mounted on a shaft parallel to the shaft of the drum. The cover (10) partially envelops the deflection pulley that pushes the projecting element away from the surface to be covered, thereby keeping the pulley vertically aligned with the opening (14) of the corresponding rails. FIG. 9(*b*) shows another example deflection pulley, having a distal end (13*d*) removed from the surface to be covered and a proximal end (13*p*) adjacent to said surface, the latter being similar to the pulley in FIG. 9(*a*). The cover partially envelops the proximal end of the deflection pulley (13) in order to change orientation, such that the projecting element (12), and in particular the discrete elements (12*d*), extend beyond the proximal end (13*p*) of the deflection pulley. The diameter of the distal end (13*d*) is less than the diameter of the proximal end, which is designed to be in contact with the discrete elements (12*p*). The distal end (13*d*) thus enables the discrete elements to be aligned before insertion into the opening (14) of the corresponding rails. This is particularly advantageous when the discrete elements are fastened pivotingly to the longitudinal edges. If the system includes two tensioning bearings (15), said tensioning bearings are positioned between the deflection pulley (13) and the drum in order to position the projecting element of the cover beyond the deflection pulley or, where applicable, beyond the proximal end thereof, when said element reaches the deflection pulley (13).

In some cases, it may be advantageous to provide an engagement shoe (50) (see FIG. 10(*a*)) that is inserted slidingly in each rail, upstream of the deflection pulley (13) in the first direction. The engagement shoe (50) is designed to bring the projecting element into contact with the locking element (6*a*, 6*c*) of the corresponding rail (6), thereby locking the projecting element in the opening of the rail. Example engagement shoes of a bead beneath a flange (6*a*) of a rail are described for example in WO2017130053, and the concept can be easily adapted to the discrete elements according to the present invention, as a function of the geometry thereof. An engagement shoe (50) also helps to clear or push away any debris in the opening of the rail downstream of the insertion point of the discrete elements in the opening of the corresponding rail.

Once inserted into the opening (14) of the corresponding rail, the discrete elements must be locked to ensure the stability of the cover covering the surface. The longitudinal edges are locked in the corresponding rails by interaction between the discrete elements and the locking element (6*a*, 6*c*) of the rails. In certain variants, locking is effected by simply releasing the transverse traction applied to the cover by the deflection pulleys (13) and optionally by the tensioning bearings, thereby enabling the locking portion of the discrete elements to be locked in the locking element (6*a*, 6*c*) of the rails. In other variants, locking is effected using a locking element outside the rails, such as flexible belts (31) that can be use both to activate translational movement of the drum and to lock the discrete elements in the opening of the rails.

In one variant, shown in FIG. 4, the locking element has a flange (6*a*) partially closing the side of the opening (14) of each rail (6) adjacent to the surface to be covered. Each discrete element (12*d*) forms a hook with an L-shaped profile, or preferably a J-shaped profile, as shown in FIGS. 3(*c*) to 3(*e*). The profile includes a portion continuously aligned with the surface of the cover and fastened to the corresponding longitudinal edge of the cover, as described above, and a transverse portion forming the hook that extends transversely in relation to the aligned portion.

The hook is designed to hook the flange (6*a*) of the corresponding rail once the transverse tension applied to the cover by the deflection pulleys (13) has been released (see FIGS. 4(*b*) and 4(*c*)). Locking is assured if the transverse portion of the discrete elements (12*d*) forming the hook includes a hooked portion, as shown in FIGS. 3(*c*) and 3(*e*). In the case of an L-shaped profile, as shown in FIG. 3(*d*), the angle between the aligned portion and the transverse portion can be slightly less than 90° to ensure anchoring with the rail. In the case of an L-shaped profile with a 90° angle, locking can be reinforced by an external, harpoon-like locking element.

Figure 5A:
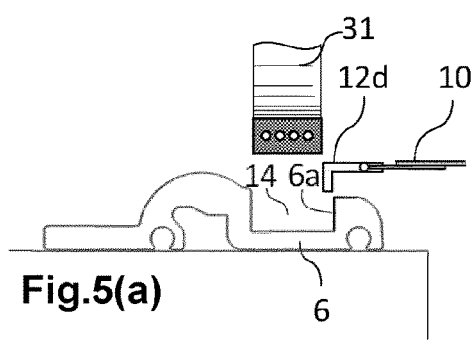
Figure 5B:
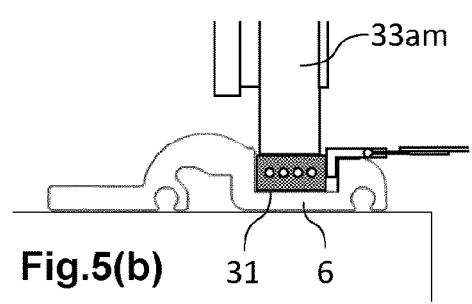
Figure 5C:
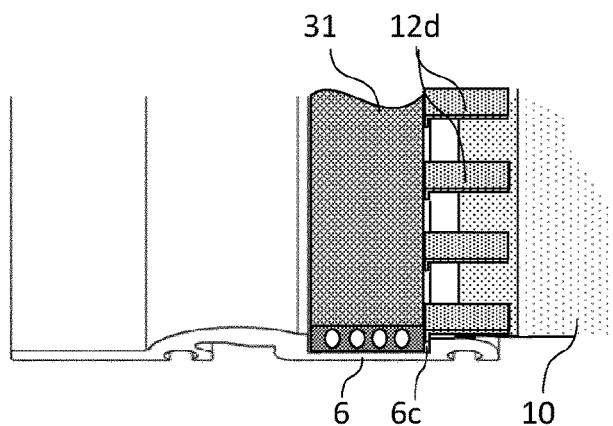
Figure 10A:
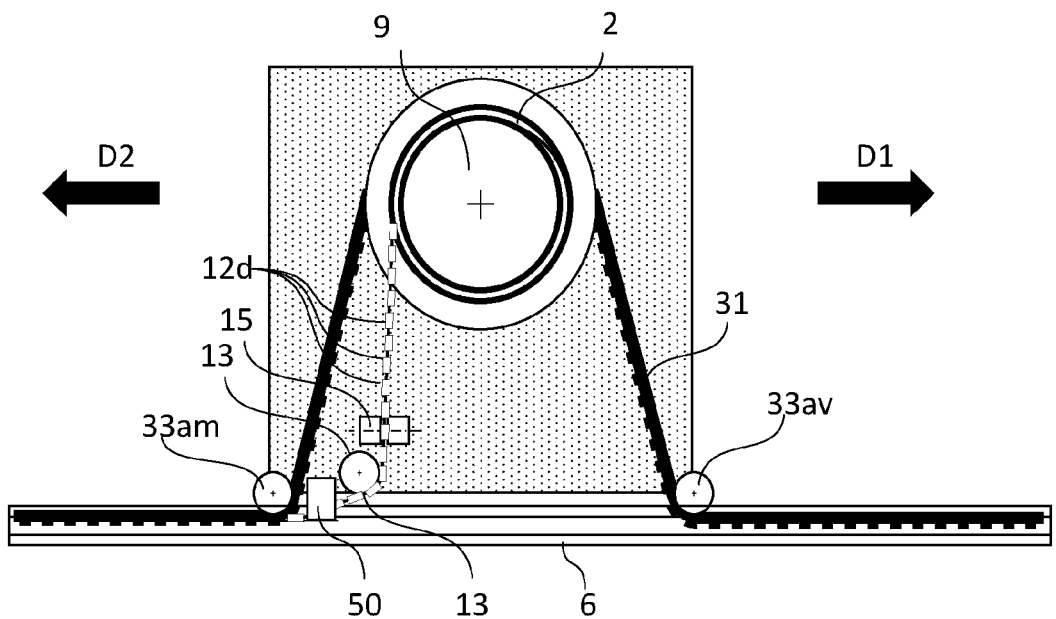
Figure 10B:
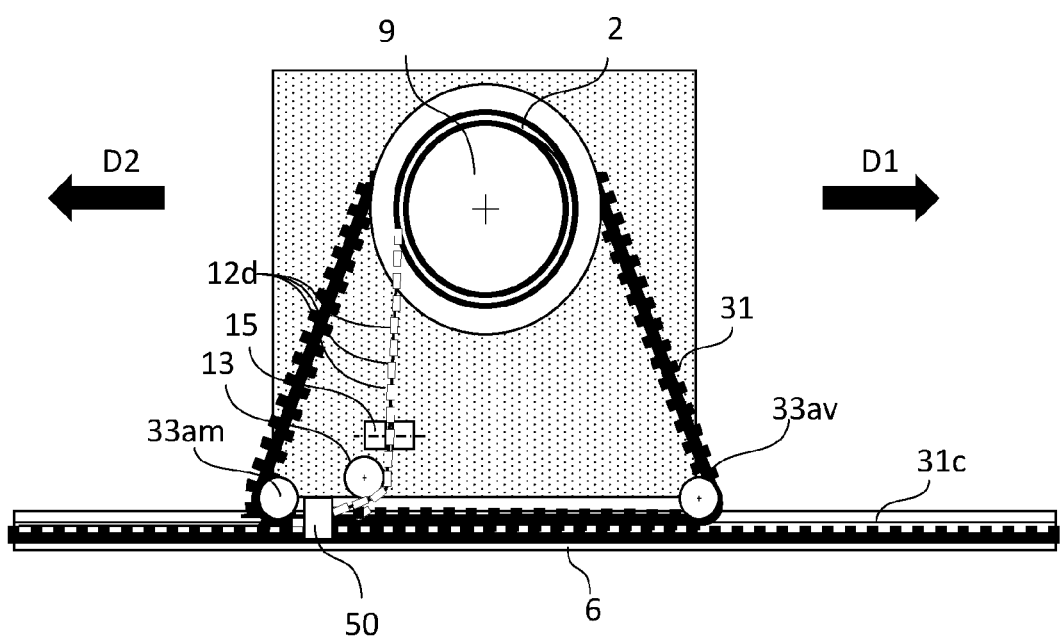

In the variant shown in FIGS. 5(a) to 5(c), the discrete elements have an L-shaped profile forming a 90° angle between the aligned and transverse portions. The locking element of the rails is formed simply by a wall normal to the surface to be covered. In order to strengthen the degree of locking in such a configuration, the locking system also includes two flexible belts (31). As shown in FIGS. 5(b) and 5(c), during translational movement of the drum in the first direction and as the cover (10) is unrolled, each belt is designed to be laid in the opening (14) of the corresponding rail once the discrete elements (12d) have been engaged and wedged in the opening. During translational movement of the drum in the second direction, each belt can be removed from said opening (14), thereby releasing the discrete elements and enabling said discrete elements to be disengaged from the corresponding rail as the cover is rolled up. This variant is particularly suitable for use with a translation mechanism as shown in FIGS. 1(a) and 10(a) and described below, including two flexible belts (31) fastened only at each of the ends (35) thereof to the four corners of the surface to be covered, extending along the longitudinal edges of the surface to be covered, and engage a drive wheel. Indeed, the flexible belts (31) can then perform several functions: (a) enabling translational movement of the drum, as described below, (b) locking the L-shaped discrete elements, and (c) closing the opening (14) over the entire length of the surface to be covered, excluding the portion (31b) between the upstream and downstream casters (33am, 33av).

Figure 3A:
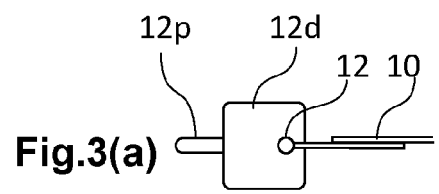
Figure 3B:
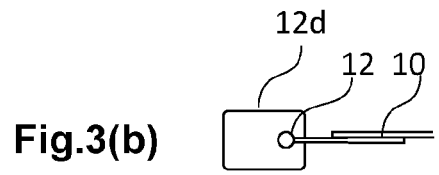
Figure 3C:
Figure 3D:
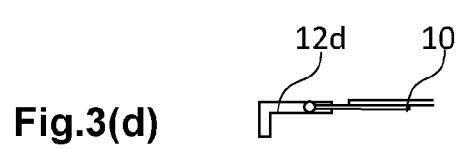
Figure 3E:
Figure 6A:
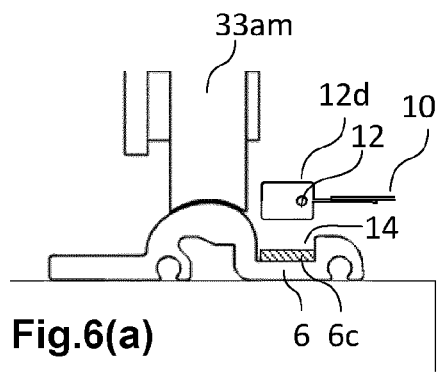
Figure 6B:
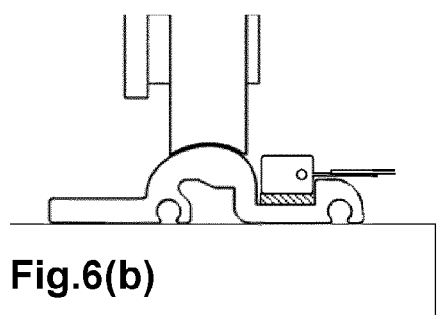
Figure 6C:
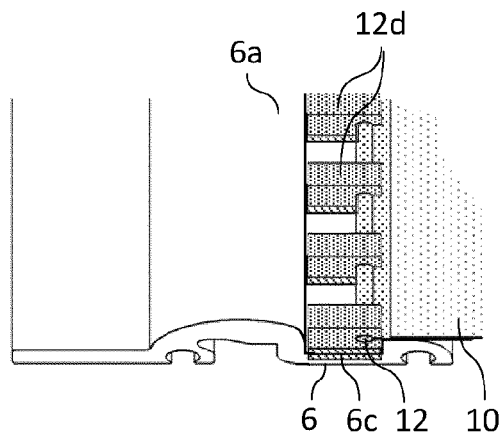

In the variant shown in FIGS. 6(a) to 6(c), the locking element includes one or more magnets (6c) positioned in the opening of each rail (6) that is closed by a transverse wall, preferably normal to the surface to be covered, on the side of the rails adjacent to the surface to be covered and the discrete elements. Each discrete element (12d) has at least one ferromagnetic portion designed to face and be attracted to one or more magnets. As shown in FIG. 3(b), the geometry of the discrete elements is not particularly limited, except that said elements must have a sufficiently large surface that is designed to interact with the magnets and must naturally protrude in order to rest on a wall of the opening of the rail. Naturally, the magnets may also be positioned on a face of the discrete elements attracted by the bottom of the metal and ferromagnetic rails. In this variant, it is more difficult to precisely control the contact position between the magnet of each discrete element and a precise zone of the rail, if the rail is made exclusively of ferromagnetic material. The attraction between the magnets and the ferromagnetic material prevents the discrete elements, which are pressed against the transverse wall by the transverse tension of the rails applied to the cover, from coming out of the opening of the rail.

Figure 3F:
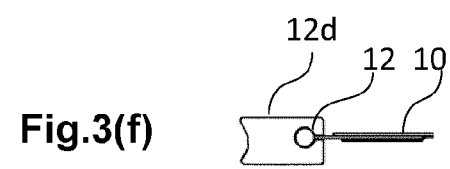
Figure 7A:
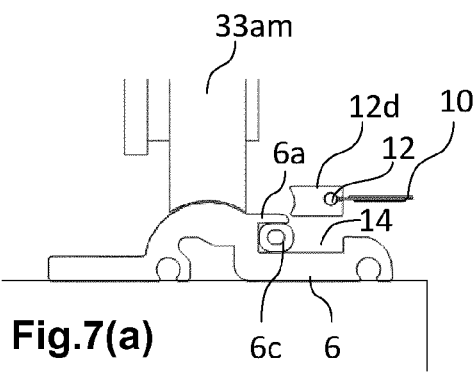
Figure 7B:
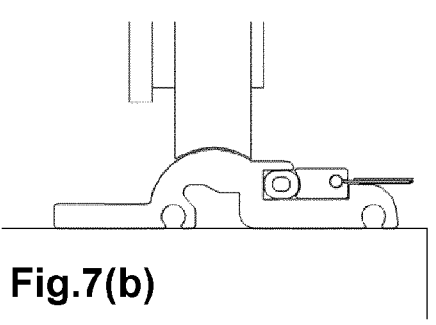
Figure 7C:
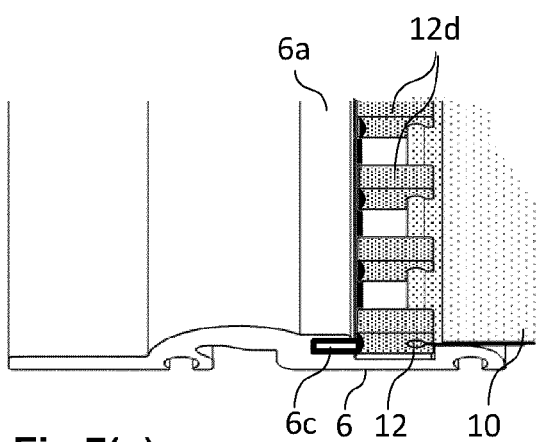

In the variant shown in FIGS. 7(a) to 7(c), the locking element and the discrete elements form a snap-fit assembly system comprising a resilient protrusion snap-fitted into a recess by elastic deformation when a discrete element (12d) is inserted into the opening (14) of said rails (6). For example, as shown in FIGS. 7(a) and 7(c), the locking element of the rails (6) can include a flange (6a) partially closing the side of the opening (14) of each rail (6) opposite the surface to be covered and a resilient element, for example a bead wedged beneath the flange (6a), projecting beyond the flange to form a resilient protrusion extending into the opening (14) towards the surface (3) to be covered. Each discrete element (12d) includes a concave cavity, as shown in FIG. 3(f), extending parallel to the longitudinal edge of the cover over a surface of the discrete element when said element is inserted into the opening (14) of the corresponding rail (6). By forcing the discrete element (12d) into the opening (14), the discrete element comes into contact with a surface of the bead forming the protrusion and deforms said bead until the discrete element reaches the intended position and the bead returns to the initial shape thereof inside the cavity of the discrete element.

Figure 3G:
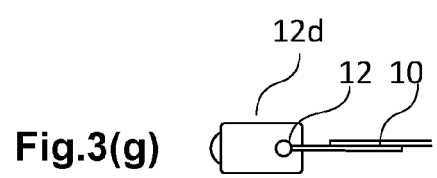

It is clear that a snap-fit locking system can also include a resilient protrusion on one face of each discrete element opposite the cover, as shown in FIG. 3(g), snap-fitting into a cavity in the form of a slot along one surface of the opening and forming the locking element of the rail.

The discrete elements can be snapped out of the opening of the corresponding rail by simply pulling on the cover while moving the drum in the second direction, thereby elastically deforming the resilient protrusion and forcing the discrete elements (12d) out of the opening.

Figure 8A:
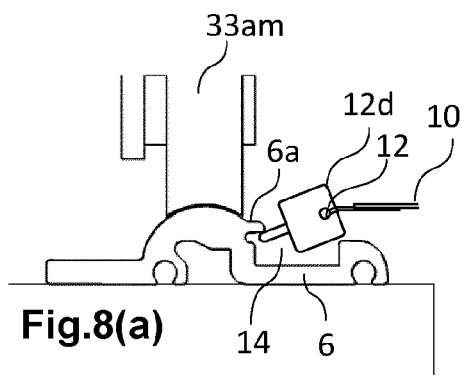
Figure 8B:
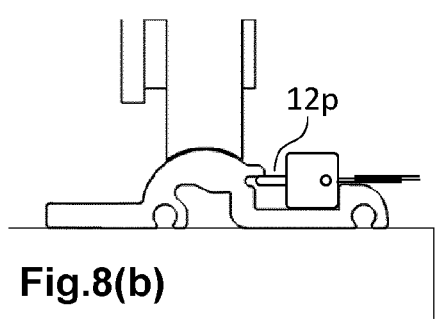
Figure 8C:
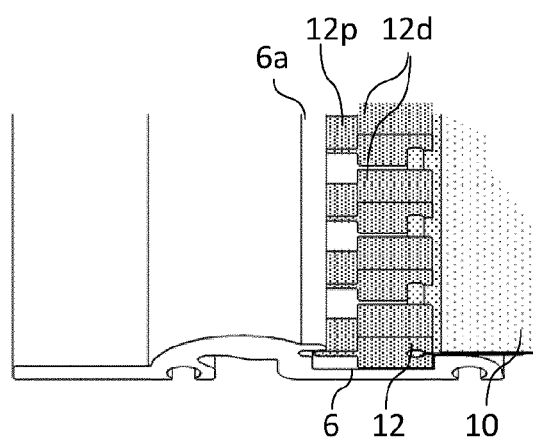

In the variant shown in FIGS. 8(a) to 8(c), the locking element has a flange (6a) partially closing the side of the opening (14) of each rail (6) opposite the surface to be covered. Each discrete element (12d) has a protrusion (12p) that extends away from the cover (10) and is aligned with the cover (10), as shown in FIG. 3(a). The protrusion is designed to slide beneath the flange (6a) when a discrete element (12d) is inserted into the opening (14) of said rails (6). As shown in FIG. 8(a), the discrete elements (12d) are inserted into the opening (14) and form an angle with the cover and with the flange (6a) in order to insert the protrusion beneath the flange and then, as shown in FIGS. 8(b) and 8(c), the discrete elements can be inserted into the opening and wedged against a wall of the opening, with the protrusion positioned beneath the flange (6a). To withdraw the discrete elements, said elements must be moved slightly away from the surface to be covered by applying a transverse tension to the cover, then lifted via the side adjacent to the surface (3) and opposite the protrusion in order to form an angle between the flange (6a) and the protrusion and to enable the protrusion to be slid out from underneath the flange to release the discrete elements.

As shown in FIGS. 1(a), 1(b), 10(a) and 10(b), the movement mechanism preferably includes a trolley (21) that is mounted on the rails (6), that transversely overhangs the surface (3) to be covered, that carries the drum (2), and that includes the following at each of the ends thereof:
- a drive wheel (9) with a rotary shaft parallel to the rotary shaft of the drum (2),
- at least one downstream caster (33av) and one upstream caster (33am) resting on the rails (6) or on a surface adjacent to the rails, enabling the longitudinal translational movement of the trolley (21). The downstream caster (33av) is mounted downstream of the drive wheel and the upstream caster (33am) is mounted upstream of the drive wheel (9) in the first direction of movement, thereby forming a preferably substantially isosceles triangle of which the drive wheel (9) is the upper apex.

The terms "upstream" and "downstream" are used in relation to the movement of the drum in the first direction to deploy the cover on the surface. The surface portion positioned upstream of the drum is already covered by the cover, while the surface portion positioned downstream of the drum is not yet covered by the cover. As shown in FIGS. 4 to 8, if the upstream and downstream casters (33am, 33av) are resting on the rails (6), said casters are neither necessarily nor preferably inside the opening (14), but adjacent to the opening, in order to prevent the upstream caster (33) from rolling over the discrete elements engaged in the opening.

The drum usually moves along a surface to be covered or uncovered at a constant speed. The drive wheels (9) therefore have to turn at a substantially constant rotational speed. However, in particular for long surfaces, the external diameter of the drum can vary considerably depending on whether the cover is deployed or withdrawn. Since the deployment/withdrawal speed of the cover depends on the rotational speed of the drive wheels (which is generally constant) and since the external diameter of the drum varies as a function of the portion of cover rolled up thereon, the drum and the drive wheels (9) cannot rotate at the same speed. For smaller covers, it is possible to offset the speed differences by exerting traction on the cover. For longer covers, such as for a swimming pool or a semi-trailer, means for adjusting the relative rotational speed between the rolling/unrolling drum of the cover and the rotary shaft of the drive wheels (9) must be provided. These means may include a helical spring positioned inside the drum (2) to offset the difference between the rotational speed of the drive wheels, which must remain substantially constant, and the rotational speed of the drum, which varies as a function of the external diameter of the drum as the cover is rolled up/unrolled. As described above, during deployment of the cover, the drum rotates spontaneously as a result of the tension created by the cover, which is fastened at the upstream transverse end of the surface to be covered. If the helical spring is stretched during deployment of the cover (10) over the surface, there is no need to motorize rotation of the drum when withdrawing and rolling up the cover about the drum, the rotation of which is driven by the contraction of the helical spring. This system is very advantageous since it does not require a second motor, gear system or electronic control system to rotate the drum at the correct speed.

In a preferred embodiment of the translation mechanism illustrated in FIGS. 1(*a*) and 10(*a*), the translation mechanism includes two flexible belts (31) fastened only at each of the ends (35) thereof to the four corners (34) of the surface to be covered, in which each of the two belts (31):

(a) is positioned in the opening (14) of the rails (6) in the lateral sections (31*a*) between a fastening point (37) at the end (35) of each of the belts (31) and the caster (33) closest to said fastening point (37) at the end (35) of each of the belts (31), and (b) grip the drive wheel (9) in the central section (31*b*) between the two casters (33).

The belt portions inserted in the lateral section (31*a*) positioned upstream of the upstream caster (33*am*), i.e. between the upstream caster and the upstream transverse end of the surface, are preferably inserted in the opening in a space between the discrete elements (12*d*) and a transverse wall opposite the surface to be covered, enabling the discrete elements to be further locked in the opening of the rail, as shown in the variant in FIGS. 5(*a*) to 5(*c*). Such a variant is particularly beneficial since the flexible belts fulfil multiple functions. Firstly, the flexible belts move the trolley along the rails. Since the angular segment of the drive wheel (9) engaged by a flexible belt (31) as described above is much greater than the angular segment engaged by a straight gear rack, for example arranged on the bottom of the rail, the risk of a drive wheel slipping is considerably reduced. Such slipping of a drive wheel could cause the trolley to skew and block the system. A second advantage of such a system is that, between the trolley and the ends (35) of the flexible belts (31) at each corner (34) of the surface to be covered, the opening (14) is closed by the belt (31) that is inserted in the rail in the two sections (31*a*) thereof upstream and downstream of the drum, and the belt is in contact with the discrete elements in the sections (31*a*) upstream of the upstream casters (33*am*). This helps to reduce the ingress of foreign bodies in the rails, such as dust, gravel, twigs, etc., and prevents people from catching their toes therein, for example in the case of a swimming pool. Finally, and this more specifically concerns the present invention, the belts enable the discrete elements to be locked in the opening of the corresponding rails as the discrete elements (12*d*) are inserted in the opening of the rail, as discussed in relation to FIGS. 5(*a*) to 5(*c*).

In an alternative variant of the translation mechanism illustrated in FIGS. 1(*b*), 1(*c*) and 10(*b*), the translation mechanism includes the following elements: Two flexible belts (31*d*) grip the upstream and downstream casters (33*am*, 33*av*) and the drive wheel (9). Each flexible belt has an inner face and an outer face separated from the inner face by a thickness of the belts, the outer face of each flexible belt is notched and the inner face of each flexible belt is either notched or textured. The inner surface of each flexible belt grips the upstream and downstream casters (33*am*, 33*av*) and the drive wheel (9).

Two gear racks (31*c*) are arranged along the longitudinal edges and parallel to the opening (14) of each rail (6), and in some cases inside said opening. The notched outer surface of a portion of each of the flexible belts between the corresponding downstream caster (33*av*) and the corresponding upstream caster (33*am*) meshes with the corresponding gear rack. The rotation of the drive wheels causes the rotation of the flexible belts, thereby moving the drum by meshing with the static gear racks. The drive wheels may also be brought into direct contact with the gear racks, but the contact surface between the gearing on the drive wheels and the gear racks is much smaller than with the solution including flexible belts described above, thereby preventing slippage that would skew the drum in relation to the rails and stop the device from working.

A covering device according to the present invention is particularly suited to covering surfaces such as:

(a) a pool filled or otherwise with a liquid, such as a swimming pool, or a water retention, treatment or desalination pool, (b) a sports field, such as a tennis court or cricket pitch, (c) a vehicle body, such as a trailer, (d) a glazed surface such as a greenhouse, a conservatory or a window of a vehicle.

With the device according to the present invention, a surface (3) can be covered by a cover (10) very simply in the following manner:

(a) the drum (2) is at the upstream end of the surface to be covered, with a second transverse edge of the cover being fastened to the upstream transverse end of the surface and the remainder of the cover being rolled about the drum, (b) moving the drum in the first direction above the surface to be covered along the rails (6), thereby unrolling the cover from the drum and deploying the cover on the surface portion upstream of the drum, while simultaneously guiding and holding the projecting element (12, 12*d*) of each longitudinal edge of the cover opposite the opening (14) of the corresponding rail (6) as the drum moves forward, (c) bringing the projecting element into contact with the locking element in the opening (14) of the rail and locking the projecting element to the rail.

In a covering device as described above, the longitudinal edges of the cover are firmly locked, thereby enhancing safety, in particular in the case of pools, filled or otherwise with water or another liquid. This also provides a very effective seal between the space beneath the cover and the space above the cover. Again in the case of pools, this makes it possible to significantly limit the evaporation of water and chemicals, such as chlorine. This also makes it possible to pressurize the space beneath the cover. In order to lock the longitudinal edges of the cover in this manner, the discrete elements are subjected to numerous mechanical torsional, tensile and even compressive stresses when passing through the various bearings and pulleys, which can cause the wear and breakage thereof. In this case and unlike a worn or damaged continuous bead, the damaged discrete element can be easily changed.

The invention claimed is:

1. A device (1) for covering a surface (3) comprising:
   (a) a substantially rectangular cover (10) with two longitudinal edges opposite one another and two transverse edges opposite one another, each of the longitudinal edges being provided with a projecting element (12, 12d) extending along each of the longitudinal edges,
   (b) a drum (2) of a radius that is mounted in rotation and is designed to roll up and unroll the cover (10), said drum (2) being mounted on a longitudinal translation mechanism on rails (6) arranged on both sides of said surface (3), each of the rails is made of a section with an opening (14) on one of faces thereof that is oriented away from the surface to be covered, and being provided with a locking element (6a, 6c), said translation mechanism enabling the longitudinal translational movement of the drum in a first direction to unroll and deploy the cover over the surface to be covered (3), and in a second direction to roll up and withdraw the cover from said surface (3),
   (c) a deflection pulley (13) provided on each side of the surface to be covered to guide and position said projecting element (12, 12d) of each of the longitudinal edges of the cover opposite the opening (14) of the corresponding rail (6) during translational movement of the drum in the first direction to unroll the cover,
   (d) a continuous locking system for locking the projecting element (12, 12d) of the longitudinal edges of the cover (10) in the opening (14) of said rails (6), enabling the projecting element to be locked with the locking element (6a, 6c) of the corresponding rail, once the projecting element has been engaged in the opening (14) and as the cover (10) is unrolled, and to release the projecting element by disengaging from the locking element (6a, 6c) during translational movement of the drum in the second direction and as the cover is rolled up,
      the projecting element of each of the longitudinal edges of the cover includes a multitude of discrete elements (12b) distributed along each of the longitudinal edges, and
      the discrete elements (12d) have an average length (L) and are arranged side by side along the corresponding longitudinal edge, separated from one another by an average distance (d) that is equal to or greater than 0, forming projecting units of average length (Lu=L+d), in which the average length (L) and average distance (d) are measured parallel to the rails (6) when the cover is deployed, each of the discrete elements has a mechanical flexural rigidity at least two times greater than the mechanical flexural rigidity of the cover, and
      the average length (Lu) of the projecting units does not exceed $2\pi R/N$, in which N is the number of projecting units and $N \geq 10$ is a real number, and where R is the radius of the drum.

2. The device as claimed in claim 1, in which
   the locking element has a flange (6a) partially closing a side of the opening (14) of each of the rails (6) adjacent to the surface to be covered, and
   each of the discrete elements (12d) forms a hook with an L-shaped or J-shaped profile, having
      a portion continuously aligned with the surface of the cover and fastened to the corresponding longitudinal edge of the cover, and
      a transverse portion forming the hook, extending transversely in relation to the aligned portion
      the hook being designed to hook the flange (6a).

3. The device as claimed in claim 1, in which
   the locking element includes one or more magnets (6c) positioned in the opening of each of the rails (6), and
   each of the discrete elements (12d) has at least one ferromagnetic portion designed to face and be attracted to one or more magnets when the discrete element is inserted in the opening (14) of said rails (6).

4. The device as claimed in claim 1, in which
   the locking element has a flange (6a) partially closing a side of the opening (14) of each of the rails (6) opposite the surface to be covered, and
   each of the discrete elements (12d) has a protrusion (12p) that extends away from the cover (10) and is aligned with the cover (10), the protrusion being designed to slide beneath the flange (6a) when one of the discrete elements (12d) is inserted in the opening (14) of said rails (6).

5. The device as claimed in claim 1, in which the locking element and the discrete elements form a snap-fit assembly system comprising a protrusion snap-fitted into a recess when one of the discrete elements (12d) is inserted into the opening (14) of said rails (6).

6. The device as claimed in claim 2, in which the locking system also includes two flexible belts (31) each of which can,
   during translational movement of the drum in the first direction and as the cover (10) is unrolled, be laid in the opening (14) of the corresponding rail once the discrete elements (12d) have been engaged and wedged in the opening of the rail, and
   during translational movement of the drum in the second direction, be removed from said opening (14), thereby releasing the discrete elements and enabling said discrete elements to be disengaged from the corresponding rail as the cover is rolled up.

7. The device as claimed in claim 1, characterized in that the translation mechanism includes a trolley (21) that is mounted on the rails (6), that transversely overhangs the surface (3) to be covered, that carries the drum (2), and that includes the following at each end of the translation mechanism:
   a drive wheel (9) with a rotary shaft parallel to the rotary shaft of said drum (2),
   at least one downstream caster (33av) and one upstream caster (33am) resting on the rails (6) or on a surface adjacent to the rails, enabling the longitudinal translational movement of the trolley (21), in which the former is mounted downstream and the latter is mounted upstream of the drive wheel (9) in the first direction of movement, thereby forming a triangle of which the drive wheel (9) is an upper apex.

8. The device as claimed in claim 7, in which the downstream caster (33av) and the upstream caster (33am) rest on the corresponding rail (6) and in which the translation mechanism includes two flexible belts (31) fastened only at each of the ends (35) thereof to a plurality of corners of the surface to be covered, and extend along the longitudinal edges of the surface to be covered in the following manner:
- the flexible belts are positioned in the opening (14) of the rails (6) in lateral sections (31a) between a fastening point (35) and the caster (33av, 33am) closest to said fastening point, thereby locking the discrete elements (12d) inserted into the opening (14) in one of the lateral sections (31a) containing the downstream caster (33av),
- the flexible belts grip the drive wheel (9) in a central section (31b) between the two casters (33av, 33am).

9. The device as claimed in claim 7, in which the translation mechanism includes:
- two flexible belts (31d) including an inner face and an outer face separated from the inner face by a thickness of the belt, both the inner and outer faces of each of the flexible belts being notched, the inner surface of each of the flexible belts gripping the upstream and downstream casters (33am, 33av) as well as the drive wheel (9), and
- two gear racks (31c) arranged along the longitudinal edges and parallel to the opening (14) of each of the rails (6), preferably inside said opening, the outer surface of a portion of each of the flexible belts between the corresponding downstream caster (33av) and the upstream caster (33am) meshing with the corresponding gear rack.

10. The device as claimed claim 1, also including an engagement shoe (50) of the projecting element, inserted slidingly in each of the rails, upstream of the deflection pulleys (13) in the first direction of translational movement, said engagement shoe being designed to bring the projecting element into contact with the locking element (6a, 6c) of the corresponding rail (6) to lock the projecting element in the opening of the rail.

11. A use of a device as claimed in claim 1, to cover a surface (3) selected from:
- a pool filled or otherwise with a liquid, such as a swimming pool, or a water retention, treatment or desalination pool,
- a sports field, such as a tennis court or cricket pitch,
- a vehicle body,
- a glazed surface such as a greenhouse, a conservatory or a window of a vehicle.

12. A method for covering a surface (3) with a cover (10) using a covering device as claimed in claim 1, in which:
(a) the drum (2) is at an upstream end of the surface to be covered, with one of the transverse edges of the cover being fastened to the upstream end of the surface and the remainder of the cover being rolled about the drum,
(b) moving the drum in a first direction above the surface to be covered along the rails (6), thereby unrolling the cover from the drum and deploying the cover on the surface upstream of the drum, while simultaneously guiding and holding the projecting element (12, 12d) of each of the longitudinal edges of the cover opposite the opening (14) of the corresponding rail (6) as the drum moves forward,
(c) bringing the projecting element into contact with the locking element in the opening (14) of the rail and locking the projecting element to the rail.

* * * * *